Sept. 16, 1924.
H. W. PLEISTER
BRIDLE WIRE SUPPORT OR BRACKET
Filed March 30, 1923
1,508,721
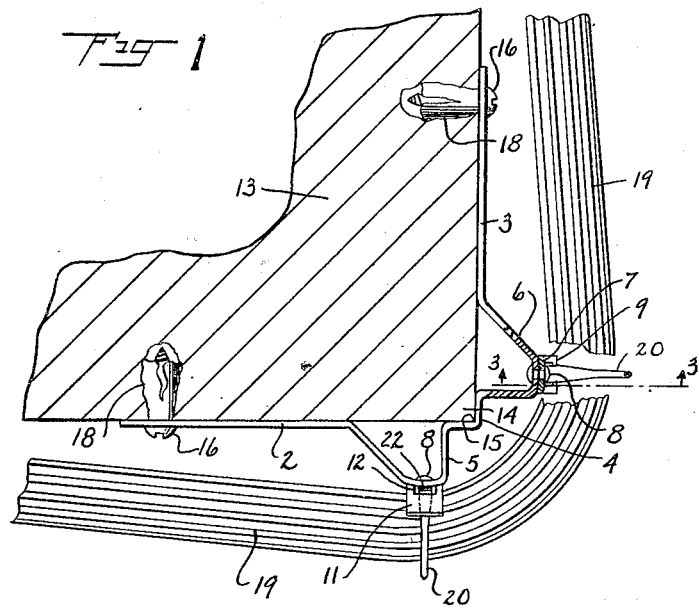
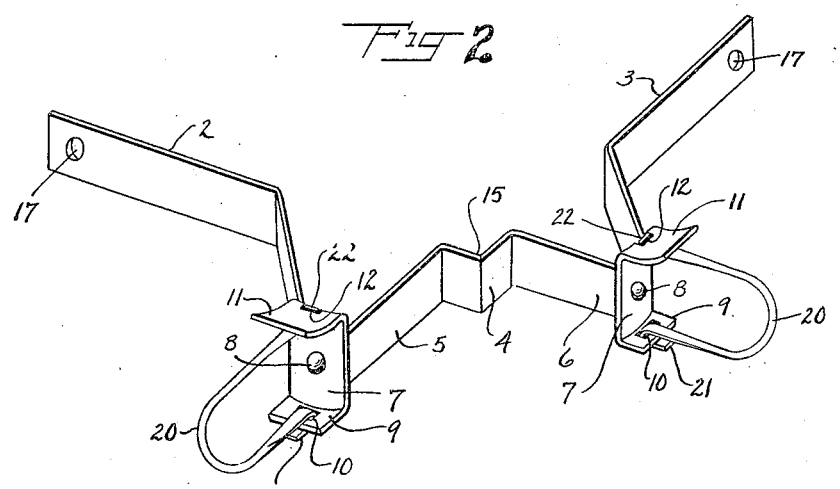
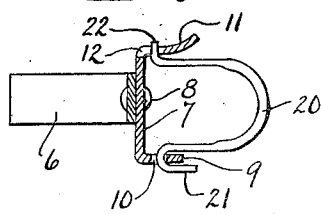
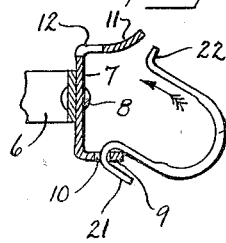
INVENTOR
Henry W. Pleister
BY
Alan M. Johnson
ATTORNEY Patented Sept. 16, 1924.

1,508,721

UNITED STATES PATENT OFFICE.

HENRY W. PLEISTER, OF WESTFIELD, NEW JERSEY, ASSIGNOR TO HENRY B. NEWHALL.

BRIDLE-WIRE SUPPORT OR BRACKET.

Application filed March 30, 1923. Serial No. 628,891.

*To all whom it may concern:*

Be it known that I, HENRY W. PLEISTER, a citizen of the United States, residing at Westfield, in the county of Union and State of New Jersey, have made certain new and useful Improvements in Bridle-Wire Supports or Brackets, of which the following is a specification, taken in connection with the accompanying drawings.

My invention relates to a bridle wire support or bracket, for use with runs of bridle wires, and more particularly to support the bridle wires when they change direction, as for example, passing around a corner of a building or other structure.

My invention further relates to certain combinations, sub-combinations, articles of manufacture, and details of construction, all of which will be more fully hereinafter described and pointed out in the claims.

In the figures in which I have shown one embodiment of my invention, the same reference numerals refer to similar parts in the several figures.

Fig. 1 is a horizontal section, taken on an irregular section line, one of the projections or horns and bridle rings being shown in section for purpose of clearer illustration;

Fig. 2 is a perspective view of my bridle wire support or bracket;

Fig. 3 is a vertical section, taken on the line 3—3 of Fig. 1, showing the bridle ring in its operative position;

Fig. 4 is a vertical section, on the same line 3—3 of Fig. 1, but showing the bridle ring about to be attached to the base member.

In stringing one or more runs of bridle wires on buildings, walls, fences or other supports, it is found in practice, particularly when the direction of the run is changed, as by passing around a corner, that the wires will rub and chafe so as to impair their insulation and often require new wires to be strung.

By my invention I form a single unitary bridle wire support or bracket, which will fit any corner, and which can be made at minimum expense. It will also support the runs of bridle wires at a distance from the surfaces of the building, wall or other suitable support, so that in swaying, in a wind or storm, they will not come in contact with the building, wall or other similar support, and therefore will not be rubbed or chafed. I further provide a removable bridle ring, which can be snapped into position and will be held immovably in the bridle wire support or bracket, yet can be removed, when desired, by the aid of a screw-driver or other similar tool.

By my invention, it is only necessary to use two screws, or other similar fastening means, for the angular portion of the support or bracket cooperates with the corner of the building, wall or other suitable support, and prevents the support or bracket swinging upon the two fastening screws.

In the form of my invention shown, the bridle wire support or bracket 1, has two base members 2 and 3 at an angle to each other, and is provided with an angular portion 4, and with horns or projections 5 and 6. On these horns or projections, I rivet, by the rivets 8, 8, or otherwise secure, the convex bases 7, 7 of bridle ring supports, as shown clearly in Fig. 1. The bridle ring base 7 is provided with a flange 9, in which is formed a slot or recess 10. The other portion of the bridle ring base 7 is provided with a curved or hook member 11 in which there is a hole or opening 12. By arranging the members 7, 7 convex, as shown more particularly in Fig. 1, they do not cut or mar the runs of bridle wires in direct contact with them.

In positioning my bridle wire support or bracket, it is merely necessary to place it on the building or wall 13 at the proper elevation, and bring the corner 14 of the wall into the opening 15 of the angular portion 4, then pass nails, or screws 16, 16 through the two openings 17, 17 of the support or bracket 1. I have shown these screws 16, 16 cooperating with bolt anchors 18, 18 but of course it is to be understood, that if the wall 13 is wood, the screws may be screwed directly into the wall without using such bolt anchors.

The runs of bridle wires 19, 19 can be strung by bringing them tight against the convex members 7, 7 before the bridle rings 20, 20 are attached; or, these bridle rings may be first attached and then the runs of bridle wires 19, 19 may be threaded through them, whichever is found most convenient on the particular job.

These bridle rings 20 are preferably formed out of spring metal, usually wire, and are provided at either end with hooks 21 and 22. The hook 21 is preferably flat and is first hooked into the slot or recess 10 in the flange 9. The bridle ring is then swung up, or pivoted upon the flange 9, until the hook 22 engages with the inclined surface of the hook member 11. Further movement in the direction of the arrows, shown in Fig. 4, will cause the bridle ring to be compressed until the hook 22 registers with the opening 12 in the hook portion 11, when the hook 22 will instantly snap into the opening 12 and be in the position shown in Figs. 1, 2 and 3. To prevent accidental disengagement of the bridle ring from the member 7, I preferably form the parts so that it will take some little pressure to force the hook 22 into the opening 12, as it slides down the inclined surface of the hook member 11, Fig. 4. This insures that practically no amount of swaying, wind or other pressure, will cause the bridle ring to become disengaged from the member 7. When, however, it is desired for any reason to remove, replace, or add to, the runs of bridle wires, and it is desired to remove the bridle rings 20, 20 this can be done by the lineman, by simple manipulation with the aid of a screw driver, or similar tool, pressed beneath the hook member 11 with sufficient force to withdraw the hook 22 from the opening 12. The entire bridle ring 20 may then be easily removed, by reversing the operation previously described.

While my bridle wire support or bracket 1 is preferably formed out of pressed sheet material, as pressed steel, it may be formed from castings of malleable iron, brass, an alloy, aluminum or any other metal, or it may be made out of pressed fibrous material.

It will be noted that by bending or casting the different base members 2 and 3, so as to form the projections or horns 5 and 6 that the bridle rings, supported on the convex members 7, 7 will be held some little distance from the base members 2 and 3 and the angular portion 4. This insures that the runs of bridle wires will never come in contact with the base members 2 and 3, or the corner of the building, or the angular portion 4.

Having thus described this invention in connection with an illustrative embodiment thereof, to the details of which I do not desire to be limited, what is claimed as new and what is desired to secure by Letters Patent is set forth in the appended claims.

What I claim is:—

1. A new article of manufacture comprising a bridle wire support or bracket bent back upon itself to form base members at an angle to each other, and means carried by each base member to support runs of bridle wires at a distance from the base members to prevent rubbing or chafing of the bridle wires.

2. A new article of manufacture comprising a bridle wire support or bracket bent back on itself to form base members at an angle to each other, with a connecting angular member to fit a corner snugly, means to support runs of bridle wires, each of said base members being provided with means to cooperate with a single securing fastener.

3. The combination of a bridle wire support or bracket having base members at an angle to each other and provided with an intermediate angular portion, means to support runs of bridle wires, and securing means to hold said support in position, said intermediate angular portion being a part of the securing means.

4. The combination of a bridle wire support or bracket having base members at an angle to each other, means on the base members to support runs of bridle wires, a single fastening means cooperating with each base member, and an angular portion between the base members to fit the corner of a wall or other support and prevent the support getting out of line.

5. The combination of a bridle wire support or bracket having base members at an angle to each other, means to support each base member on a wall or other suitable support, each base member being provided with projections, and means on each projection to support runs of bridle wires so that they will not be rubbed or chafed.

6. The combination of a bridle wire support having base members at an angle to each other and bent to form horns or projections, means cooperating with each base member to secure it to a wall or other support, and bridle rings on the horns or projections.

7. The combination of a bridle wire support having base members at an angle to each other and bent to form horns or projections, and an intermediate angular portion to fit the corner of a wall or other support and assist in holding the support in position, and bridle rings on the horns or projections, and fastening means cooperating with the base members.

8. A new article of manufacture comprising a bridle wire support or bracket formed from sheet metal and bent to form two base members at an angle to each other with an intermediate angular portion to fit a corner, each base member being bent to form a projection or horn extending out from its base member, and means on each projection or horn to secure runs of bridle wires.

9. A new article of manufacture comprising a bridle wire support, having a base and a projecting horn, a convex member mounted on the projecting horn with its convex surface mounted to extend outward from the projecting horn, and means to secure runs of bridle wires against said convex member so as to prevent rubbing or chafing of the bridle wires.

10. A new article of manufacture comprising a bridle wire support having two base members at an angle to each other, projecting horns, one on each base member, two convex members one mounted on each horn with its convex surface mounted to extend outward from its particular horn, locking surfaces on each convex member to cooperate with a detachable bridle ring, and detachable bridle rings cooperating with the locking surfaces of the convex members, adapted to hold and secure runs of bridle wires on supporting surfaces at an angle to each other without rubbing or chafing said wires.

HENRY W. PLEISTER.

Witnesses:
MARY R. RYAN,
ANNA WILLIAMS.